United States Patent Office 3,057,854
Patented Oct. 9, 1962

3,057,854
METHOD OF OBTAINING CELLULOSE TRIESTERS FROM THEIR ESTERIFICATION SOLUTIONS IN COMMINUTED FORM
Carlton L. Crane, Rochester, N.Y., assignor to Eastman Kodak Company, Rochester, N.Y., a corporation of New Jersey
No Drawing. Filed Mar. 21, 1960, Ser. No. 16,144
10 Claims. (Cl. 260—227)

This invention relates to the obtaining of cellulose triesters in comminuted form from their esterification solutions containing sulfuric acid catalyst in which the sulfuric acid is neutralized with an excess of a di or trivalent metal compound neutralizing agent and the acid and anhydride are removed by vacuum distillation accompanied by agitation.

Heretofore, in the recovery of cellulose esters from esterification solutions in comminuted form, a suitable diluent such as water or aqueous acetic acid has been supplied to the mass to precipitate the ester in the form of powder or flake which is then purified and stabilized.

One object of my invention is to recover triesters of cellulose from their esterification solutions in the form of comminuted products which can be readily purified. Another object of my invention is to provide a method for recovering cellulose triesters from esterification solutions in which the lower fatty acid and anhydride therein are recovered in undiluted condition. A further object of my invention is to provide a method of obtaining cellulose triesters which avoids destruction of the fatty acid anhydride in the completed esterification bath. Other objects of my invention will appear herein.

I have found that a cellulose triester prepared by esterifying cellulose with an esterification bath containing sulfuric acid catalyst, the anhydride of a fatty acid of 2-4 carbon atoms and a fatty acid of 2-4 carbon atoms, can be satisfactorily recovered in comminuted or powder form without water dilution if the sulfuric acid present in the esterification solution is neutralized by an excess of a di or trivalent metal compound neutralizing agent and the fatty acid and anhydride therein are removed therefrom by vacuum distillation accompanied by agitation. I have found that by proceeding in this manner, a product of high purity and superior heat stability can be obtained, the dilution and precipitation steps normally required can be eliminated and the fatty acid and anhydride are recovered from the esterification bath in undiluted condition. As liquid is distilled from the esterification bath, the anhydride concentration in that bath passes through a maximum since the aliphatic acids common to these esterification baths boil at lower temperatures than their anhydrides, hence are removed first from the esterification bath. As a consequence, an optimum condition for the esterification of residual cellulose hydroxyl is passed through which is of particular advantage in the manufacture of cellulose triesters. Substantially hydroxyl-free cellulose esters of good stability may be thus obtained.

A procedure for the obtaining of cellulose triesters involves reacting upon cellulose with an esterification bath employing a sulfuric acid catalyst, an anhydride of a fatty acid of 2-4 carbon atoms and a lower fatty acid diluent therein, the fatty acid ordinarily corresponding to the anhydride. It is desirable in such an esterification, particularly if viscosity is of significance, that the liquid esterification solution be in an amount 4-20 times the weight of the cellulose being esterified. The temperature should not rise to a maximum of more than 125° F. unless a lower viscosity product with high color is desired. After neutralizing the sulfuric acid catalyst, it is desirable to subject the mass to an elevated temperature such as at least 200° F. or more, preferably, 200–350° F. If desired, the vacuum distillation may be carried out at a temperature of at least 200° F., more particularly 200–350° F. thus combining these steps. The amount of neutralizing agent should be 1½–5 times that which will neutralize the sulfuric acid in the mass. The preferred neutralizing agent is a basic di or trivalent metal compound. Compounds useful for neutralizing sulfuric acid catalyst are the carbonates, hydroxides, oxides or acetate of calcium, magnesium, barium, iron and aluminum. The neutralization of the sulfuric acid with a substantial excess of neutralizer results in products containing substantially low hydroyl but with good color and heat stability.

An advantage of my invention for preparing comminuted cellulose esters is that the entire operation, esterification, catalyst neutralization and removal of fatty acid and anhydride can be carried out in the same esterification mixer. While the liquid is being substantially removed from the esterification bath by means of vacuum distillation, the cellulose ester mass is kept in motion and assumes a paste form and finally a dry powder form. If desired, the recovery of the reaction liquids can be stopped after the product assumes a highly swollen granule form. It is sometimes desirable to stop at this point and begin washing the cellulose ester, particularly if the ester in its dry state is not swollen by water to any appreciable extent. Washing at this point assists in the removal of salts and traces of acids which might have become absorbed by the product and which would have been more difficult to remove had the product been allowed to harden.

If a product of very low ash content is desired, complete uniformity of particle size can be insured by first passing the material, after distilling off substantially all of the liquid, through a comminutor with weak lower fatty acid (such as 5–50% acid) to facilitate removal of salt from the cellulose ester and maintain a highly swollen physical form followed by washing such as in a countercurrent wash system until a product substantially free of acid is obtained. If still further purification is desired, the product may be boiled in distilled water containing oxalic acid or it may be treated with weak hydrochloric acid solution. A combination of the treatments described in this paragraph may be used followed by thorough washing with distilled water to substantially free the product from acid. After the liquid is recovered from the esterification bath in the form of anhydrous water-clear acid and anhydride, it may in some cases be employed for further esterification of cellulose.

My invention is useful for the recovery of cellulose triesters of fatty acids of 2–4 carbon atoms generally including not only cellulose triacetate, cellulose tripropionate or cellulose tributyrate, but also mixed triesters such as substantially fully esterified cellulose acetate propionate, cellulose acetate butyrate or cellulose propionate butyrate. The vessel in which the distillation is carried out is given a reduced pressure such as 5 to 202 mm. of mercury. However, if one cares to evacuate the vessel even more, no reason can be seen why such further evacuation could not be used. The pressure employed is such that the cellulose ester is not subjected to an unduly high temperature. The agitation of the mass during the vacuum distillation while the liquids are being removed may be obtained by running the stirrer of the reaction mixer thereby preventing agglomeration of the product.

The following examples illustrate the obtaining of powdered cellulose triesters in accordance with my invention:

*Example 1*

Four parts of refined cotton linters were immersed in distilled water for one hour and then centrifuged. These centrifuged linters were treated with successive changes of propionic acid so as to substantially completely remove the water therefrom, the resulting mass comprising about 7.5 parts by weight. These linters, containing 3.5 parts of propionic acid, were placed in a jacketed sigma-bladed mixed with 16 parts of 97% propionic anhydride and the mass was cooled to 42° F. A mixture of 0.073 part of sulfuric acid and 0.6 part of propionic acid was added to the mixer and the temperature was allowed to rise to 86° F. over a period of 7½ hours. Upon completion of the reaction, 0.28 part of 85% magnesium carbonate was added and the temperature was raised to and maintained at 200° F. for 31 hours while continuing the stirring with the mixer. The reaction vessel was then evacuated and the fatty acid and anhydride therein were removed by vacuum distillation, a fine white powder remaining in the mixer. This powder was washed with successive changes of distilled water until substantially free of acids and was then dried. The product obtained did not show discoloration upon heating it for a considerable time, indicating good heat stability. The product obtained had a hydroxyl content of 0.07%. Testing for heat stability by heating at 205° C. for one-half hour left the material still in the form of a fine white powder.

*Example 2*

350 parts of acetylation-grade cotton linters were placed in a sigma-bladed, jacketed esterification mixer with 1,165 parts of 97% acetic anhydride and 1,920 parts of acetic acid. After stirring for 30 minutes at 110° F. and cooling to 42° F. there was added a mixture of 25.7 parts of 95% sulfuric acid and 50 parts of acetic acid whereupon esterification proceeded with the temperature being allowed to rise to 106° F. over one hour which temperature was maintained for 2 hours.

26 parts of 85% magnesium carbonate were added to the mixer and the mass was heated to 186° F. 24 parts of 85% magnesium carbonate was then added and stirring and heating were continued until the mass reached a temperature of 241° F. The temperature was maintained until 4 hours had elapsed from the first addition of magnesium carbonate. A condenser and receiver were then attached to the mixer and vacuum as applied while the mixing was continued. The vacuum was maintained while applying heat to drive off all of the acetic acid and acetic anhydride in the mixer. There was obtained water-clear anhydrous acetic acid and anhydride which were suitable for reuse without further purification. There remained in the mixer a fine powder which was removed, passed through a comminutor to insure uniform particle size, washed in successive changes of distilled water to remove acids and salts and was dried. The dry product had the following analysis: hydroxyl 0.02%, acetyl 44.78%, intrinsic viscosity in methylene chloride/methyl alcohol (9:1) 1.66, ash 0.07%, total sulfur content 0.001%.

*Example 3*

350 parts of acetylation-grade cotton linters were placed in a jacketed sigma-bladed esterification mixer together with 1,165 parts of 97% acetic anhydride and 1,920 parts of acetic acid. The mas was stirred at 110° F. for 30 minutes. It was then cooled to 40° F. and a mixture of 25.7 parts of 95% sulfuric acid and 50 parts of acetic acid were added to the mixer. The reaction temperature was allowed to rise to 100° F. over a period of 2.5 hours.

At the completion of the esterification, 26 parts of 85% magnesium carbonate were added to the mixer and the temperature was raised to 185° F. over a period of 20 minutes. 24 parts of 85% magnesium carbonate were then added and a temperature of 243° F. was maintained for 3¼ hours. When the neutralization of the catalyst was completed, a condenser and receiver were attached to the mixer and sufficient vacuum was applied to reduce the temperature to 213° F. While the mass was stirred and the vacuum was maintained, the acetic anhydride and acid were removed and the product was recovered as a fine powder. Clear anhydrous acetic acid and acetic anhydride were recovered as distillates.

The dry powder of cellulose triacetate thus obtained was passed through a comminutor together with 40% acetic acid washed in successive changes of acetic acid baths of progressively diminishing concentrations (40–30–10%), then in successive changes of distilled water until the product was substantially free of acid. The powder was centrifuged and divided into equal parts. One portion (A) was dried at 160° F. without further treatment, the remainder (B) was boiled for 2 hours in distilled water containing 0.0022 part oxalic acid per part of cellulose ester. The product was drained and dried at 160° F. The white, dry product analyzed as follows:

|  | A | B |
| --- | --- | --- |
| Ash, percent | 0.02 | 0.01 |
| Total OH, percent | 0.09 | 0.10 |
| Acetyl, percent | 44.67 | 44.63 |
| [n] in methylene chloride/methyl alcohol 9:1 | 2.19 | 2.20 |
| Bulk density | 40 | |

*Example 4*

Acetylation-grade cotton linters were soaked in distilled water for 1 hour. They were centrifuged and then soaked in successive changes of propionic acid until the liquid was essentially anhydrous.

950 parts of the thus activated linters, consisting of 500 parts of cellulose and 450 parts of 98% propionic acid were placed in a jacketed sigma-bladed esterification mixer with 25 parts of propionic acid and 2,000 parts of 97% propionic anhydride (having 26° F. temperature). The mass was cooled to 42° F. and added thereto was a mixture of 9.4 parts 95% sulfuric acid and 25 parts of propionic acid. The reaction temperature was allowed to rise to 75° F. over a period of 5¼ hours.

After the completion of the esterification, 35.6 parts of 85% magnesium carbonate was added to the mixer. The reaction temperature was raised to 250° F. and was maintained for 4 hours. A vacuum was then applied sufficient to reduce the temperature of the solution from 250 to 236° F. with constant steam pressure on the mixer jacket. Vacuum and agitation were maintained until substantially all of the residual reaction liquids were distilled off and the product was recovered as a fine dry powder of cellulose tripropionate. The distillate obtained was a mixture of propionic acid and propionic anhydride.

The dry powder obtained was passed through a comminutor together with 40% aqueous acetic acid. The powder was washed in successive changes of 40–30–20–10% acetic acid and then with distilled water until substantially free from acids and salts. The dry product analyzed as follows:

[n] in methylene chloride/methyl alcohol, 9:1 ____ 1.05
Total hydroxyl _____percent__ 0.20

*Example 5*

750 parts of cotton linters which had been activated by soaking in distilled water and dewatered with propionic acid and which consisted of approximately 400 parts of linters and 350 parts of propionic acid were placed in a jacketed sigma-bladed esterification mixer together with 1,930 parts of propionic acid and 1,280 parts of acetic anhydride. After cooling to 50° F., a mixture of 21.8 parts of 94% sulfuric acid and 77 parts of propionic acid was added to the mixer, starting the esterification. The reaction temperature was allowed to rise to a maximum of 97° F. over a period of 2¾ hours. At the end of this time, the esterification was completed whereupon 41.5 parts of 85% magnesium carbonate were added and the temperature was raised to 250° F. and maintained for 3 hours. A vacuum condensing system was then attached to the mixer and the residual reaction liquids were removed by vacuum distillation while agitating the mass. Sufficient vacuum was applied to the system to reduce the distillation temperature to 100° F. and this temperature was maintained until 90% of the residual reaction liquids in the bath were recovered as clear anhydrous liquids. The essentially dry product resulting, fully esterified cellulose acetate propionate, was passed through a comminutor with aqueous acetic acid (40%). It was then washed countercurrently until substantially free from residual acids and salts and was dried. The dry powder product analyzed as follows:

| | |
|---|---|
| $[n]$ in $CH_2Cl_2/CH_3OH$, 9:1 | 1.8 |
| Acetyl _____percent | 25.5 |
| Propionyl _____do | 21.9 |
| Total hydroxyl_____do | 0.08 |

*Example 6*

374 parts of acetylation-grade cotton linters (6.6% moisture) were placed in a jacketed sigma-bladed esterification mixer with 950 parts of acetic acid and 1,050 parts of acetic anhydride. The mass was stirred for 30 minutes at 110° F. The mixture was cooled to 40–42° F. and added thereto was a mixture of 800 parts of butyric acid and 29 parts of 94% sulfuric acid, whereupon the temperature was allowed to rise to 90° F. over a period of 3½ hours.

The esterification being completed, there was added 56 parts of 85% magnesium carbonate and the reaction temperature was raised to 241° F. and maintained for 9 hours. A vacuum condensing system was then attached to the mixer and a vacuum sufficient to reduce the temperature to 105° F. was applied. The temperature and vacuum were maintained and the mass was stirred until 95% of the residual reaction liquids were removed from the reaction bath. These liquids formed a clear anhydrous distillate. The product was a fine, essentially dry powder of fully esterified cellulose acetate butyrate. This material was passed through a comminutor together with aqueous acetic acid (40%) and was then washed countercurrently in weak acid until substantially free from acids and salts whereupon it was dried. The dry product analyzed as follows:

| | |
|---|---|
| Acetyl _____percent | 40.1 |
| Butyryl _____do | 6.1 |
| $[n]$ in $CH_2Cl_2/CH_3OH$, 9:1 | 2.1 |
| Total hydroxyl_____percent | 0.14 |

*Example 7*

The procedure described in Example 1 was repeated except that after completion of the reaction and the addition of 0.28 part of 85% magnesium carbonate, the temperature of the mass in the stirrer was raised to 250° F. while continuing the stirring. The mixer was then evacuated to a sufficient extent to reduce the temperature of the reaction mass to 210° F. which temperature was maintained with continuation of agitation until a powder precipitate had formed. The precipitate obtained was removed from the mixer, passed through a comminutor and then washed and dried. The product obtained had a hydroxyl content of 0.1 and heating for 8 hours at 180° C. left the material in the form of a fine white powder unchanged in color.

Products prepared by the process in accordance with my invention are useful in the manufacture of cellulose ester materials especially where high acetyl content esters of good stability may be desirable. For instance, these products are soluble in solvents such as methylene chloride-methyl alcohol to give clear, flexible, tough films and yarns or they may be employed in preparing molding compositions or the like.

I claim:

1. A method of preparing cellulose triesters in comminuted form which comprises (1) substantially completely esterifying cellulose with an esterifying bath of fatty acid of 2–4 carbon atoms, anhydride of fatty acid of 2–4 carbon atoms and sulfuric acid esterification catalyst, (2) neutralizing the sulfuric acid with a polyvalent metal compound neutralizing agent selected from the group consisting of the carbonates, hydroxides, oxides and acetates of magnesium, barium, iron and aluminum in an amount equivalent to 1½–5 times the sulfuric acid, and (3) subjecting the mass to heat and agitation at 200–350° F. and at reduced pressure until substantially all of the liquid has been removed therefrom.

2. A method of preparing cellulose triesters in comminuted form which comprises (1) substantially completely esterifying cellulose with an esterifying bath of fatty acid of 2–4 carbon atoms, anhydride of fatty acid of 2–4 carbon atoms and sulfuric acid esterification catalyst, (2) neutralizing the sulfuric acid with a polyvalent metal compound neutralizing agent selected from the group consisting of the carbonates, hydroxides, oxides and acetates of magnesium, barium, iron and aluminum in an amount equivalent to 1½–5 times the sulfuric acid and subjecting to a temperature of 200–350° F., and (3) subjecting the mass to heat and agitation at 200–350° F. and at reduced pressure until substantially all of the liquid has been removed therefrom.

3. A method of preparing cellulose triesters in comminuted form which comprises (1) substantially completely esterifying cellulose with an esterifying bath of fatty acid of 2–4 carbon atoms, anhydride of fatty acid of 2–4 carbon atoms and sulfuric acid esterification catalyst, (2) neutralizing the sulfuric acid with a polyvalent metal compound neutralizing agent selected from the group consisting of the carbonates, hydroxides, oxides and acetates of magnesium, barium, iron and aluminum in an amount equivalent to 1½–5 times the sulfuric acid, and (3) subjecting the mass to a temperature of 200–350° F. and agitation with the containing vessel being evacuated until substantially all of the liquid has been removed therefrom.

4. A method of preparing cellulose triesters in comminuted form which comprises (1) substantially completely esterifying cellulose with an esterifying bath of fatty acid of 2–4 carbon atoms, anhydride of fatty acid of 2–4 carbon atoms and sulfuric acid esterification catalyst, (2) neutralizing the sulfuric acid with a polyvalent metal compound neutralizing agent selected from the group consisting of the carbonates, hydroxides, oxides and acetates of magnesium, barium, iron and aluminum in an amount equivalent to 1½–5 times the sulfuric acid, (3) subjecting the mass to heat and agitation at 200–350° F. and at reduced pressure until substantially all of the liquid has been removed therefrom, and (4) passing the cellulose ester mass through a comminutor to further comminute the mass.

5. A method of preparing cellulose triesters in comminuted form which comprises (1) substantially completely esterifying cellulose with an esterifying bath of fatty acid of 2–4 carbon atoms, anhydride of fatty acid of 2–4 carbon atoms and sulfuric acid esterification catalyst, (2) neutralizing the sulfuric acid with a magnesium compound neutralizing agent in an amount equivalent to 1½–5 times the sulfuric acid, and (3) subjecting the mass to heat and agitation at 200–350° F. and at reduced pressure until substantially all of the liquid has been removed therefrom.

6. A method of preparing cellulose triacetate in comminuted form which comprises (1) substantially completely esterifying cellulose with an esterifying bath of acetic acid, acetic anhydride and sulfuric acid esterification catalyst, (2) neutralizing the sulfuric acid with a polyvalent metal compound neutralizing agent selected from the group consisting of the carbonates, hydroxides, oxides and acetates of magnesium, barium, iron and aluminum in an amount equivalent to 1½–5 times the sulfuric acid, and (3) subjecting the mass to heat and agitation at 200–350° F. and at reduced pressure until substantially all of the liquid has been removed therefrom.

7. A method of preparing cellulose triesters in comminuted form which comprises (1) substantially completely esterifying cellulose with an esterifying bath of acetic acid, acetic anhydride and sulfuric acid esterification catalyst, (2) neutralizing the sulfuric acid with magnesium compound neutralizing agent in an amount equivalent to 1½–5 times the sulfuric acid, and (3) subjecting the mass to heat and agitation at 200–350° F. and at reduced pressure until substantially all of the liquid has been removed therefrom.

8. A method of preparing cellulose tripropionate in comminuted form which comprises (1) substantially completely esterifying cellulose with an esterifying bath of propionic acid, propionic anhydride and sulfuric acid esterification catalyst, (2) neutralizing the sulfuric acid with a polyvalent metal compound neutralizing agent selected from the group consisting of the carbonates, hydroxides, oxides and acetates of magnesium, barium, iron and aluminum in an amount equivalent to 1½–5 times the sulfuric acid, and (3) subjecting the mass to heat and agitation at 200–350° F. and at reduced pressure until substantially all of the liquid has been removed therefrom.

9. A method of preparing cellulose tripropionate in comminuted form which comprises (1) substantially completely esterifying cellulose with an esterifying bath of propionic acid, propionic anhydride and sulfuric acid esterification catalyst, (2) neutralizing the sulfuric acid with magnesium carbonate in an amount equivalent to 1½–5 times the sulfuric acid, and (3) subjecting the mass to heat and agitation at 200–350° F. and at reduced pressure until substantially all of the liquid has been removed therefrom.

10. A method of preparing cellulose tripropionate in comminuted form which comprises (1) substantially completely esterifying cellulose with an esterifying bath of propionic acid, propionic anhydride and sulfuric acid esterification catalyst, (2) neutralizing the sulfuric acid with magnesium carbonate in an amount equivalent to 1½–5 times the sulfuric acid, and (3) subjecting the mass to a temperature of 200–350° F. and agitation with the containing vessel being evacuated until substantially all of the liquid has been removed from the mass.

References Cited in the file of this patent

UNITED STATES PATENTS

| | | |
|---|---|---|
| 2,456,688 | Dreyfuss et al. | Dec. 21, 1948 |
| 2,469,395 | Malm et al. | May 10, 1949 |
| 2,470,191 | Seymour et al. | May 17, 1949 |
| 2,600,716 | White et al. | June 17, 1952 |
| 2,628,232 | Rosen et al. | Feb. 10, 1953 |